Patented May 17, 1927.

1,629,127

UNITED STATES PATENT OFFICE.

CLARENCE W. SPICER, OF PLAINFIELD, NEW JERSEY, ASSIGNOR TO SPICER MANUFACTURING CORPORATION, A CORPORATION OF VIRGINIA.

METHOD OF WELDING HOLLOW SHAFTS.

No Drawing.      Application filed July 20, 1926. Serial No. 123,805.

My invention relates to a method of welding hollow shafts and more particularly to a method of producing a shaft that can be revolved at speed without noise due to the rattle of spelter and welding flux within the tube after the welding operation is completed.

In the automotive field it is common practice to use hollow drive shafts to connect the power plant to the rear axle. Refinement in automobile design has brought forward the solution of many problems of noise elimination which formerly was not considered important. These propeller shafts are usually provided with a universal joint, flexible coupling, spider or other part on each end and the unit is usually assembled by butt welding these parts on each end of a steel tube. When this method is employed the spelter and welding flux fuses off within the tube causing loose pieces of metal to remain which create objectionable noises when rotating in position on the car. The object of this invention is to provide a means of eliminating this noise in an economical manner which can be used in production without unreasonable cost.

I have discovered that by placing in the tube just prior to the last weld which hermetically seals the tube a predetermined quantity of viscid fluid that the weld can be made and that any smelter or welding flux which fuses off in the tube will be picked up by the viscid fluid and held from rattling against the sides of the tube during the rotation thereof.

The properties of the viscid fluid used must be such as to prevent hardening, or rough usage of the shaft will cause the hardened fluid holding the spelter and flux in repose to break away from the inside surface of the tube and cause undesirable noises. This fluid must be of such a viscosity that it will flow around the tube so that when running the balance of the shaft will not be affected.

After considerable experimenting I have discovered that silicate of soda specific quantity 1.690 Baumé 59.1 is best suited for the purpose, but I do not wish to limit myself to that specific viscid fluid exclusively. The amount required varies with the diameter and length of the tube, but I have found that just sufficient quantity, serves best, that will film the inside surface and no more.

I wish it distinctly understood that the method employed as herein described is in the form in which I desire to practice it, and that changes or variations may be made as may be convenient or desirable without departing from the salient features of my invention and I therefore intend the following claims to cover such modifications as naturally fall within the lines of invention.

I claim:—

1. A method of butt welding ends on hollow shafts including the step of inserting in the tube before the final weld a predetermined quantity of viscid fluid.

2. A method of butt welding ends on hollow shafts including the steps of inserting in the tube before the final weld a predetermined quantity of silicate of soda.

In testimony whereof I affix my signature.

CLARENCE W. SPICER.